United States Patent
Wang et al.

(10) Patent No.: US 7,065,705 B1
(45) Date of Patent: Jun. 20, 2006

(54) AUTOMATIC LABELING IN IMAGES

(75) Inventors: Jinsheng Wang, Sunnyvale, CA (US); Lu Wang, Sunnyvale, CA (US)

(73) Assignee: Inbit, Inc., San Jose, CA (US)

( * ) Notice: Subject to any disclaimer, the term of this patent is extended or adjusted under 35 U.S.C. 154(b) by 306 days.

(21) Appl. No.: 10/725,719

(22) Filed: Dec. 2, 2003

(51) Int. Cl.
*G06F 17/24* (2006.01)

(52) U.S. Cl. ........................... 715/512; 715/526
(58) Field of Classification Search ............. 715/512, 715/526
See application file for complete search history.

(56) References Cited

OTHER PUBLICATIONS

Omura, G., "Mastering AutoCAD Release 11," Fourth Edition, Symbex, Inc., 1991, pages cover page, copyright pages, and pp. 109-125, 167-174, and 222-247.*
Ambrosius, L., "TAG1.LSP," HyperPics, copyright 1998, pp. 1-2.*
Ambrosius, L., "TAG.LSP," HyperPics, copyright 1998, pp. 1-2.*
"AutoLISP Downloads," last downloaded by the Examiner on Nov. 27, 2005 from: hyperpics.com/customization/autolist/autolist_downloads.htm, downloaded pp. 1-5.*
"Canvas Tips and Techniques," ACD Systems of America, Inc., copyright 1995-2003, downloaded pp. 1-13.*
Etrusoft, "!Quick Screenshot maker," downloaded from www.etrusoft.com/screenshot-maker/screenshotmaker-screenshot.htm.*
CompuNotes, review of "FullShot v6.03, by Inbit, Inc.," Nov. 10, 2001, published on the Internet at www.nfbnet.org/files/newsletters/COMPNOTE.168, downloaded pp. 1-2.*
Herniter, Marc E., "Schematic Capture with MicroSim™ PSpice®," Second Edition, Prentice Hall, 1996, cover page, copyright page, and pp. 1-29.*
"HyperSnap-DX," "Powerful screen capture software," last downloaded by the Examiner from the Internet on Nov. 26, 2005, from: web.archive.org/web/20020914062026/www.hyperionics.com/hsdx/index/asp, downloaded pp. 1-3.*

(Continued)

*Primary Examiner*—Doug Hutton
*Assistant Examiner*—Michael K. Botts
(74) *Attorney, Agent, or Firm*—Joe Zheng

(57) ABSTRACT

Techniques for placing sequential or individual labels in an electronic image are disclosed. According to one embodiment, label parameters are determined. These label parameters may include, but not be limited to, label styles, fonts, sizes, or increments. As objects in the image are respectively identified, labels per the parameters are automatically generated and then placed upon or near the identified objects. A tracing line may be automatically added between a pair of an identified object and a label to demonstrate a visual association. When one or more of the label parameters are adjusted, the labels are automatically and systematically changed per the changes.

23 Claims, 9 Drawing Sheets

OTHER PUBLICATIONS

OrCAD PSpice, "User's Guide," OrCAD, 1998, cover, copyright page, and pp. 15-21.*

"Pro/ENGINEER Tutorial, Lesson #1: Getting Started / Creating a Simple Part," believed to have been posted on the Internet as of Nov. 21, 2001, downloaded pp. 1-16.*

"SmartDraw.com," "Graphics software for business charts and digital photos," posted on the Internet as of Nov. 28, 2002, at: web.archive.org/web/20021128105702/http://www1.smartdraw.com/, downloaded pp. 1-17.*

TechSmith "SNAGIT, The leader in Screen Capture, Getting Started Guide," Nov. 6, 2002, downloaded from web.archive.org/web/*/http://www.techsmith.com/products/snagit/documentation.asp, downloaded pp. 1-19.*

TechSmith, "Snagit," "Version History," downloaded from TechSmith.com, downloaded pp. 1-4.*

"Tips and Hints," Jun. 7, 2002, web.archive.org/web/20020607224639/http://members.optusnet.com.au/~forwardthinking/html, downloaded pp. 1-6.*

* cited by examiner

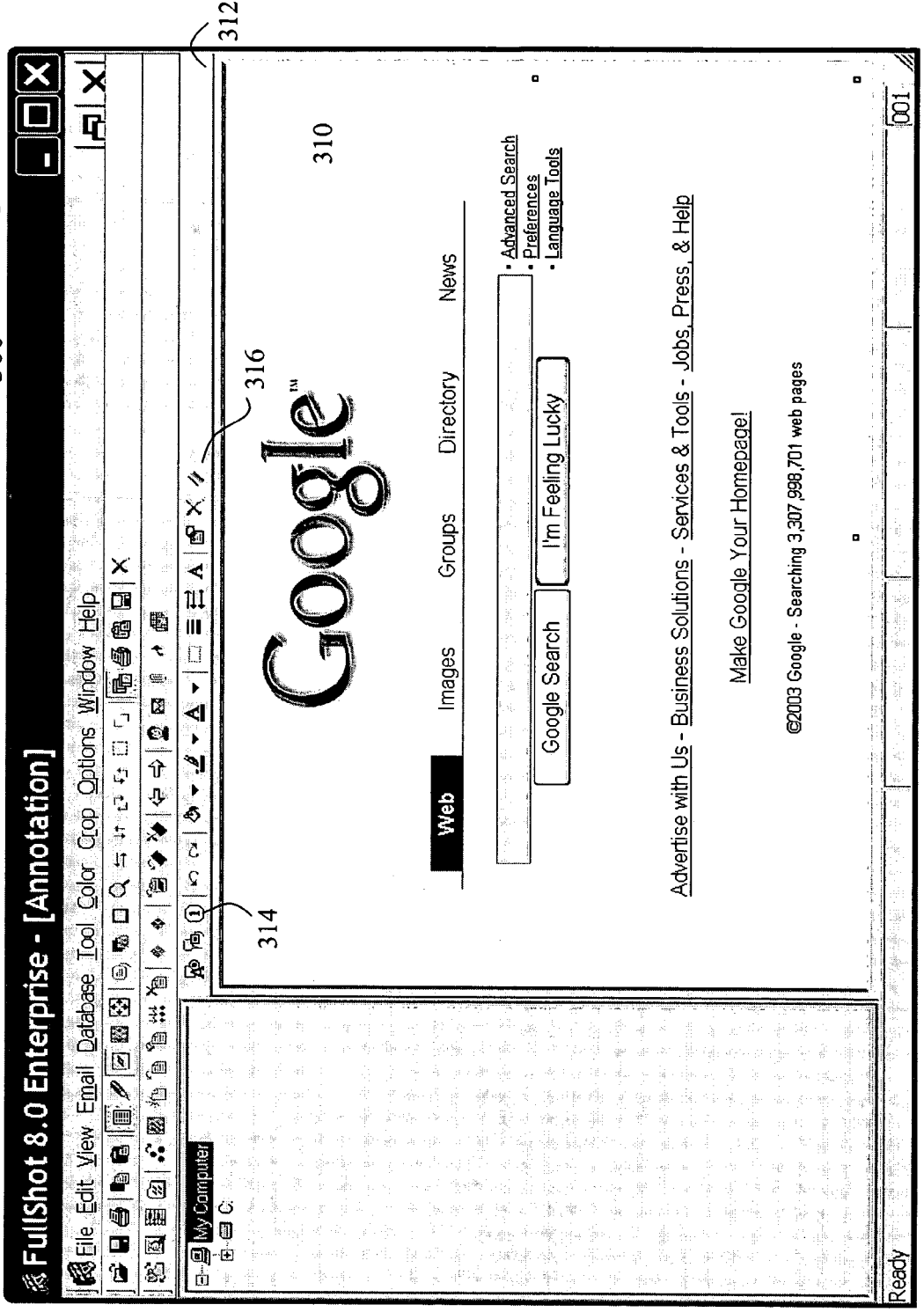

AUTOMATIC LABELING IN IMAGES

BACKGROUND OF THE INVENTION

1. Field of the Invention

The present invention is related to the area of image displays and more particularly related to solutions to automatic labeling in an electronic image that may be captured off a display being displayed on a display screen or imported from another application.

2. Description of the Related Art

There are many applications that require representation or images of displays displayed on a screen such as a computer monitor and uses of these images for non-display purposes. For example, in preparing a manual for a software product, images of various displays resulting from execution of the software are more illustrative than a lengthy description by words. With the popularity of the world wide web (www), there are more applications that require images of displays originated from network resources retrieved from the Internet.

For example, one of such applications is for preparing a patent application depending on screen snapshots for explaining various embodiments. A typical procedure involves capturing a snapshot (image) of what is being displayed on a screen for an embodiment, such image is then imported to an application (e.g., MS Powerpoint) in which essential elements to be described or claimed are labeled with reference numbers (i.e., labels). In many cases, a tracing or indication curve from an identified element to a reference number is provided to avoid obscuring other elements. FIG. 1 shows an example screen snapshot of FIG. 5D from U.S. Pat. No. 6,616,702 in which like numerals refer to like parts. A screen image is captured and reference numbers are added in to reference objects in the captured image to facilitate description of these objects or elements in the screen image. In other cases, a text box is provided to reference an object, where detailed annotations can be provided to explain the indicated object. Such use of a captured image is referred to herein as image illustration or annotation.

It is well known that many of such image annotations are done manually. When there is a change to one of the labels, such as deletion of a label or alignment of the labels, repeated efforts or tedious modification are required. Thus there is a great need for efficient solutions for automatic labeling for image annotation, changes or modification of a labeled image may be performed effortlessly.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention may be used in applications that rely on electronic images for illustrations, where elements or objects in the images need identified for explanations. Some of the applications include desktop publishing, manual, textbooks or report preparation, or even patent application preparation. These images may be captured from a display screen as a result of a display of a result (e.g., a network resource displayed in the Internet Explorer) or provided from another application or device.

According to one aspect of the present invention, label parameters are determined. These label parameters may include, but not be limited to, label styles, fonts, sizes, or increments. As objects in the image are respectively identified, labels per the parameters are automatically placed upon or near the identified objects. A tracing line may be automatically added between a pair of an identified object and a label to demonstrate a visual association. When one or more of the label parameters are adjusted, the labels are automatically and systematically changed per the changes.

According to another aspect of the present invention, various annotation signs including text boxes in various styles and highlighting colors or boundaries may be added. To preserve the original image, the labeling process is preferably performed on a duplicated or working image generated from the originally provided image. As a result, an annotated image is produced and ready for use.

The present invention may be implemented as a method, a process, and a software product. According to one embodiment, the present invention is a method comprising providing a graphic environment in which an electronic image is displayed, the graphic environment including a plurality of icons, one of the icons, once activated, providing a working image from the image that includes a number of objects and displaying a number of annotation icons, wherein one of annotation icons facilitating determination of label parameters for labels to be associated with at least some of the objects; placing a first label in the working image when one of the objects is selected; placing a second label in the working image when another one of the objects is selected, wherein the second label is automatically generated in accordance with an increment in one of the label parameters; placing additional labels in the working image when additional ones of the objects are respectively selected, wherein the additional labels are respectively and automatically generated in accordance with the increment with reference to a preceding label thereof; and saving the working image with the labels placed therein in a predetermined format to embed the labels or in a file that keeps the working image and the labels separately so that further editing to the labels is possible.

According to another embodiment, the present invention is a software product to be executable in a computing device for automatically labeling an image, the software product comprising program code for providing a working image from the image that includes a number of objects; program code for determining label parameters for labels to be associated with at least some of the objects; program code for placing a first label in the working image when one of the objects is selected; program code for placing a second label in the working image when another one of the objects is selected, wherein the second label is generated in accordance with an increment from the first label.

There are possibly other embodiments that can be appreciated in the detailed description to be followed. One of the objects of the present inventions is for providing means for labeling images automatically and systematically. Other objects and advantage together with the foregoing are attained in the exercise of the invention in the following description and resulting in the embodiments illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 3B shows that the graphic environment of FIG. 3A enters an "annotate" mode with a working image for labeling;

DETAILED DESCRIPTION OF THE PREFERRED EMBODIMENTS

Techniques are disclosed herein for automatically labeling an electronic image that may be a captured image from a display or imported from another image application. According to one aspect of the present invention, label parameters are determined. These label parameters may include, but not be limited to, label styles, fonts, size, increments or level of transparency. As objects in the image are respectively identified, labels per the parameters are automatically placed upon or near the identified objects and may be individually adjusted to a more desired location. A tracing line may be automatically added between a pair of an identified object and a label to demonstrate a visual association. When one or more of the label parameters are adjusted, the labels are automatically and systematically changed per the changes. According to another aspect of the present invention, various annotation signs including text boxes in various style, highlighting colors or boundaries may be added. To preserve the original image, the labeling process is preferably performed on a duplicated or working image. As used herein, a working image is a displayed image on which labels are to be added. In one embodiment, a working image is generated from the originally provided image. In another embodiment, a working image is the originally provided image itself and may be one of a plurality of layers. As a result of the labeling process, an annotated image is produced and ready for use.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
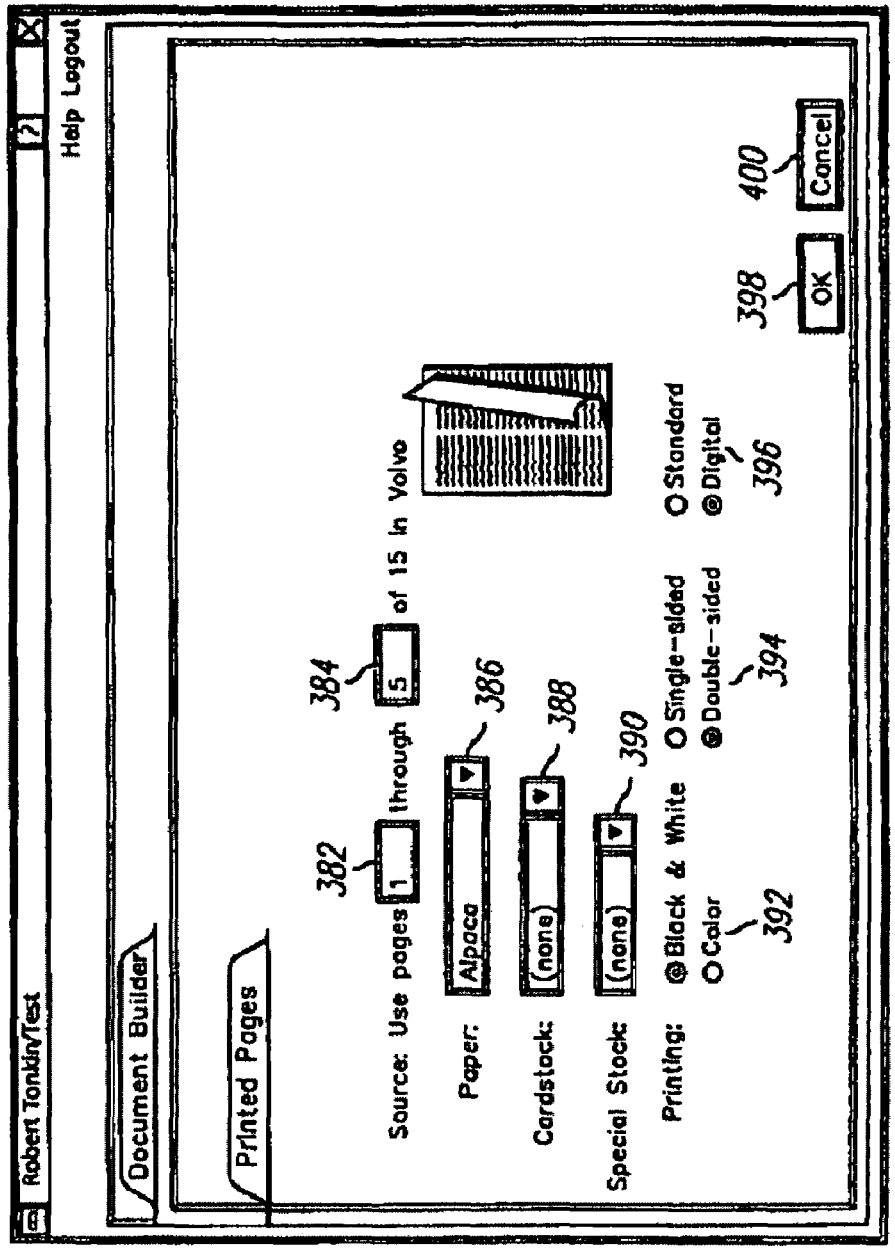
FIG. 1 shows an example of using a captured image in an issued US patent for describing an embodiment of an invention.
Figure 2:
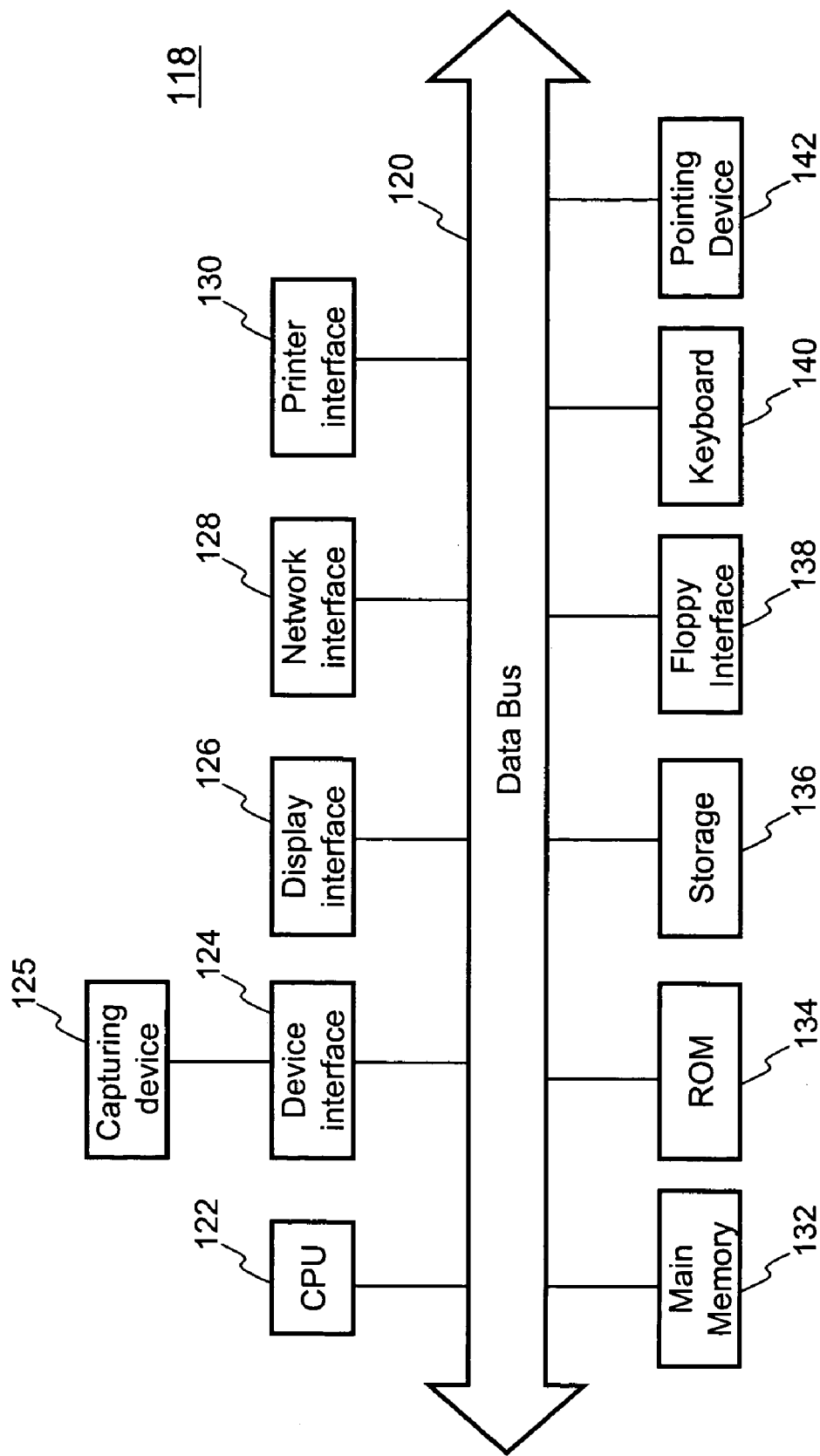
FIG. 2 shows a functional block diagram of a computing device executing an embodiment of the present invention.

Referring now to the drawings, in which like numerals refer to like parts throughout the several views, FIG. 2 shows internal construction blocks of a computing device 118 in which one embodiment of the present invention may be implemented and executed. The device 118 may be, but not limited to, a desktop computer, a laptop computer or a computing device. As shown in FIG. 2, the device 118 includes a central processing unit (CPU) 122 interfaced to a data bus 120 and a device interface 124. CPU 122 executes instructions to process data and perhaps manage all devices and interfaces coupled to data bus 120 for synchronized operations. The instructions being executed can, for example, pertain to drivers, operating system, utilities or applications. A device interface 124 may be coupled to an external device, hence, data can be received into memory 132 or storage 136 through data bus 120. Also interfaced to data bus 120 is a display interface 126, a network interface 128, a printer interface 130 and a floppy disk drive interface 138. Generally, a software module of an executable version of one embodiment of the present invention can be stored to storage 136 through floppy disk drive interface 138, network interface 128, device interface 124 or other interfaces coupled to data bus 120. Execution of such module by CPU 122 can cause the computing device 118 to perform as desired in the present invention. In one embodiment, the device interface 124 provides an interface for communicating with a capturing device 125 (e.g. a digital camera providing an image).

Main memory 132, such as random access memory (RAM), is also interfaced to data bus 120 to provide CPU 122 with instructions and access to memory storage 136 for data and other instructions. In particular, when executing stored application program instructions, such as a document securing module in the present invention, CPU 122 is caused to manipulate the data to achieve results contemplated by the present invention. Read-Only Memory (ROM) 134 is provided for storing executable instructions, such as a basic input/output operation system (BIOS) for operation of keyboard 140, display 126 and pointing device 142, if there are any.

To facilitate the description of the present invention, it is defined herein a display screen or a screen is the physical display apparatus in a device, such as a 25 inch CRT or LCD monitor commonly seen with a personal computer. A screen display, a displayed web page, a displayed window or simply a display is an image presented on the display screen. For example, a file that constitutes a display may be an HTML file, wherein HTML stands for HyperText Markup Language, an image thereof appears on a display screen when the file is read or executed by a browser. Such image may be used as a working image or a duplication thereof can be generated as a working image for the labeling process.

In many applications, displays of screens need to be captured for later references. Examples may include preparation of manuals, textbooks, reports or even patent applications with inserted screen snapshots. Objects in the captured images often need to be labeled respectively for clear explanations.

Figure 3A:
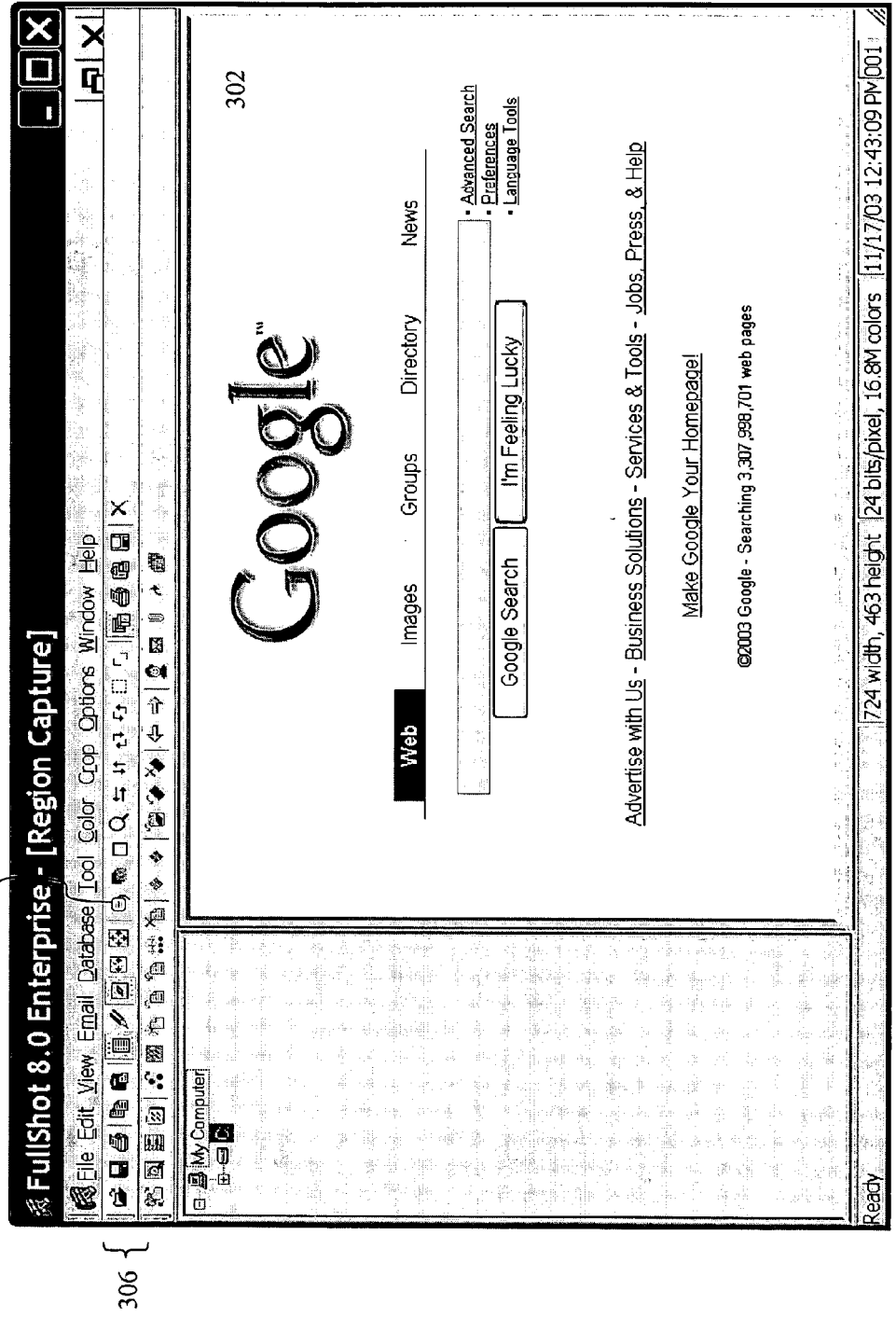
FIG. 3A shows an exemplary graphic environment implementing the present invention according to an embodiment thereof.

Referring now to FIG. 3A, there shows an exemplary graphic environment 300 implementing the present invention according to an embodiment thereof. The graphic environment 300 includes a display area showing an image 302 that is captured from a display of www.google.com homepage. It can be appreciated that the image 302 may be, for example, drawings from other applications (e.g., Microsoft Powerpoint) or provided by a capturing device (e.g., digital camera). Among the icons 306, there is a designated icon referring to as an "annotate" 304. As soon as the "annotate" 304 is activated, the graphic environment 300 enters an annotation mode to allow a user to label the image 302.

In general, it is preferred to keep the originally provided image 302. Thus a duplicated copy of the captured image 302 is produced (e.g., as a canvas in Microsoft Operating Systems) and allows a user to annotate the image as shown in FIG. 3B. The duplicated copy 310 in FIG. 3B allows the user to annotate the image without corrupting the originally captured image. It should be noted that although the image 310 is a duplicated version of the image 302, the image 310 can be a resized image to include the image 302. In certain applications, labels are preferably not to be placed on the image itself instead on the surrounding area. Thus a working image may be an image with a background surrounding the originally provided image. According to another embodiment, the originally provided image 302 is placed as an image layer over a canvas layer and the labels are placed on another layer on top of the image layer. As such, the labeling of the image 302 will not affect the image 302 itself.

Figure 3C:
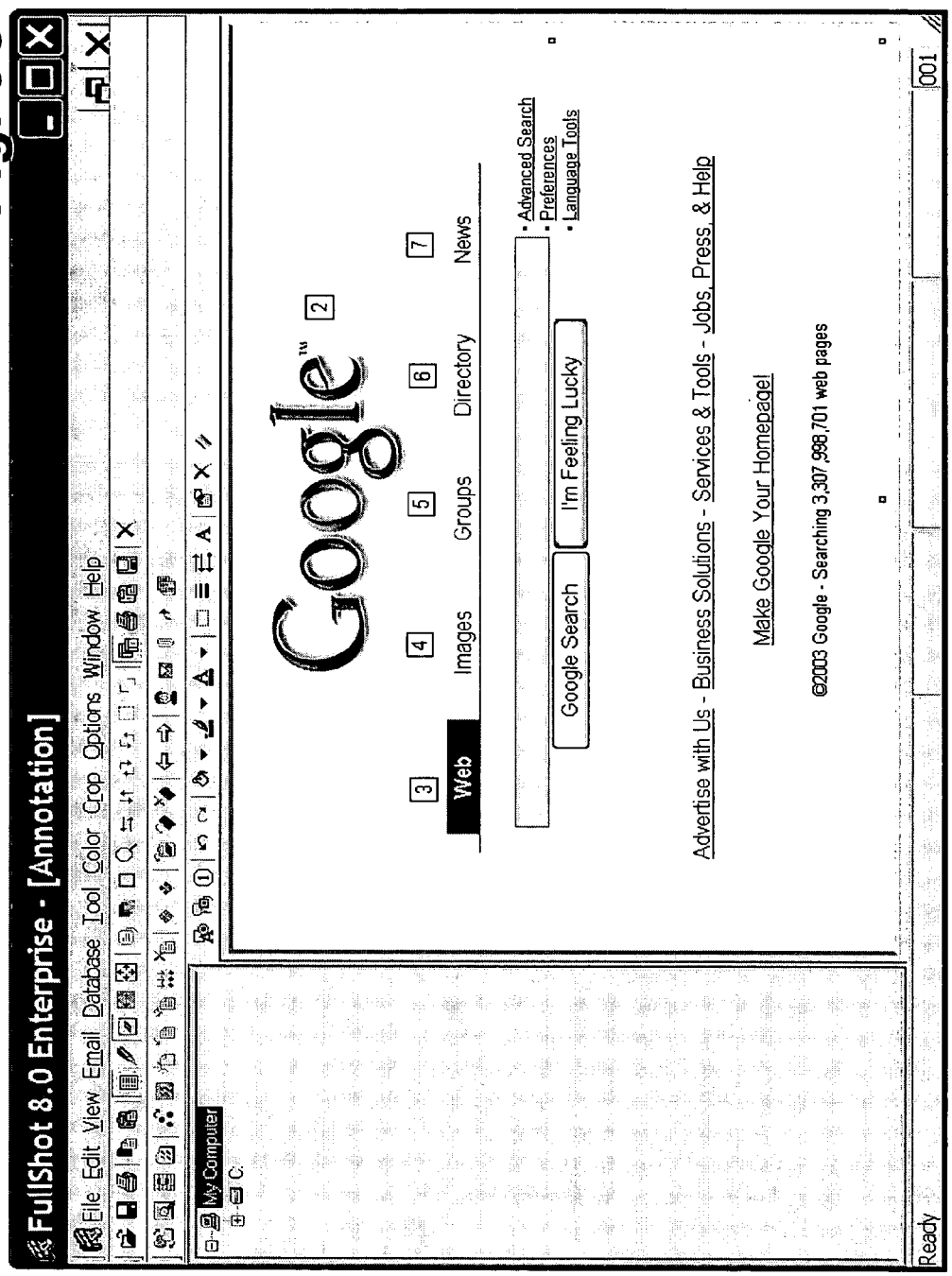
FIG. 3C shows a working image with six exemplary labels that are sequentially generated in accordance with predefined label parameters.

As shown in FIG. 3B, the graphic environment 300 is now in the annotation mode that includes an annotation bar 312. Of the icons on the annotation bar 312, a "labeling" icon 314, once activated, allows a user to place labels on or near designated objects. FIG. 3C shows that six labels are respectively placed on six different objects. In particular, label "2" designating the "Google" logo, labels "3", "4", "5", "6", and "7" designate respectively hyperlinked image icons "Web", "Images", Groups", "Dictionary" and "News".

An icon 316 in the annotation bar 312, once activated, converts an image with labels into a labeled image, namely all placed labels are embedded into the image. Generally, further changes of the labels would be difficult depending on how the labels are embedded into the original image. As an alternative, in the annotation mode, if the image with labels is to be saved, a file including the working image as well as the labels can be saved. Such file can be reopened for editing the labels if needed.

One of the important features in the present invention is that labels are automatically placed. All a user needs to do is to click (e.g., by a mouse action or touch screen) on a desired object. In operation, as soon as an object is identified, a label is automatically placed thereupon or nearby depending on a setting and subsequently the label can be repositioned or dragged along if needed. Further the initial label as well as an increment from one label to a subsequent label can be preset as one of the label parameters. For example, if the initial label is set to be 1000 with an increment being 20, the labels would be "1000", "1020", "1040" and so on. Likewise, if the initial label is set to be A with an increment being 1, the labels would be sequentially generated as "A", "B", "C" and so on. It can be appreciated by those skilled in that art various settings of the labels and the increments can be designed given the detailed description herein.

Figure 3D:
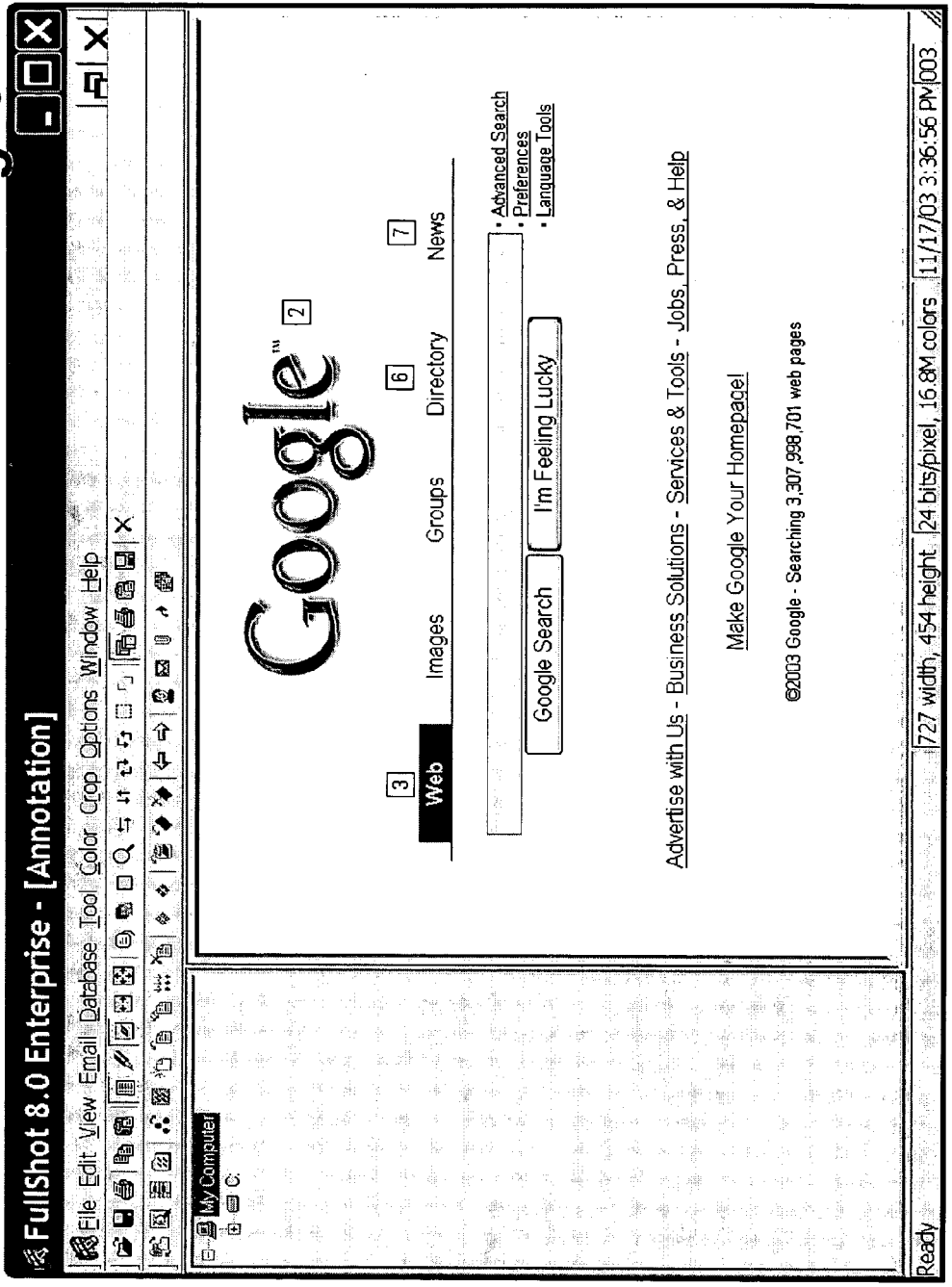
FIG. 3D shows that two of the labels in FIG. 3C are removed without effecting other labels.

In some applications, after the labeling is done, there may be a need to delete some of the labels. As another one of the important features in the present invention, deletion of some of the labels will not cause changes to other labels. FIG. 3D shows that two labels "4" and "5" have been removed. Although the labels "6" and "7" are automatically created based on the preceding labels "4" and "5", the deletion of the labels "4" and "5" neither introduce changes to the labels "6" and "7" nor affect the subsequent labeling.

Figure 3E:
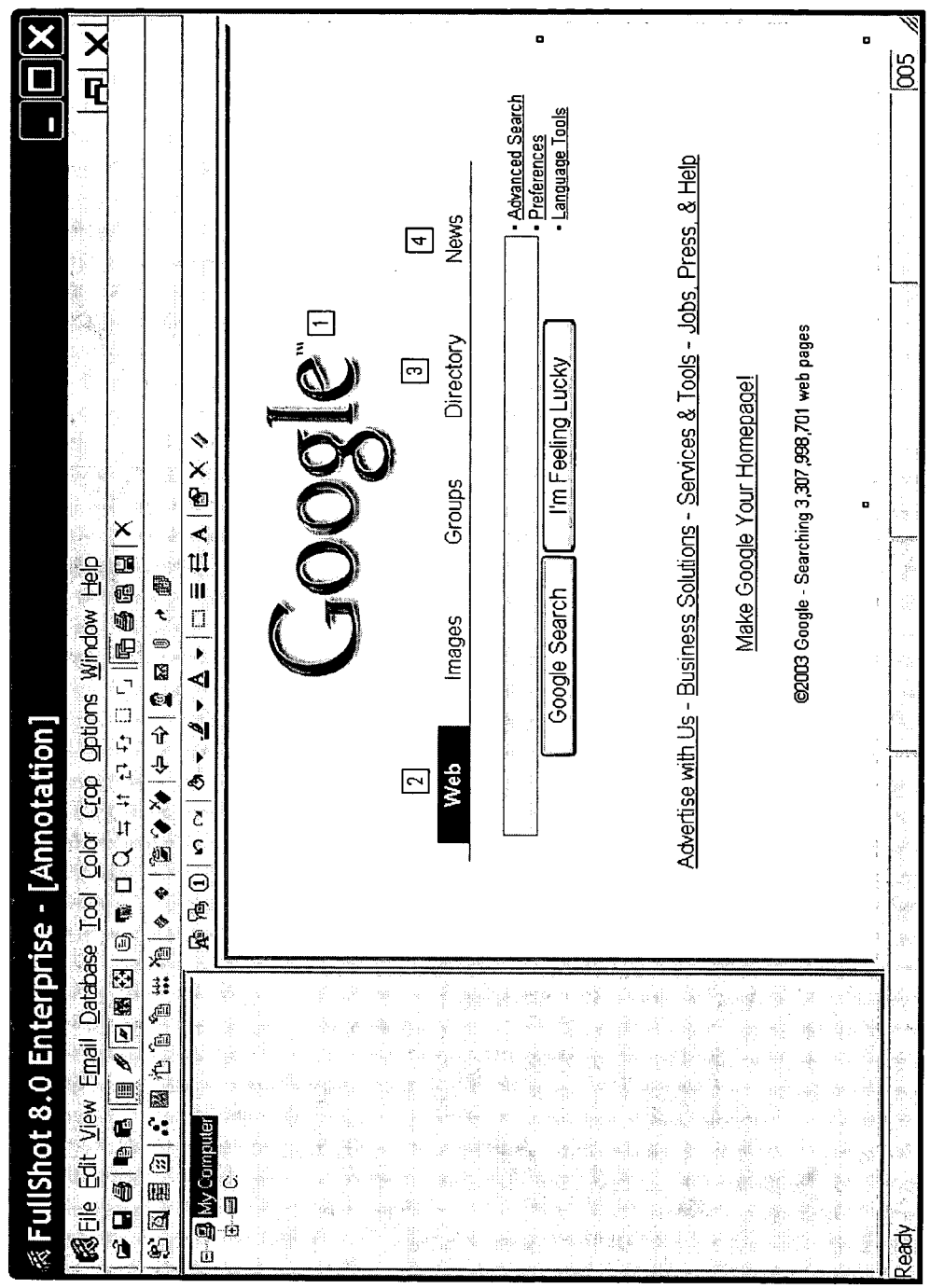
FIG. 3E shows that the remaining labels in FIG. 3D can be reset or renumbered in accordance with one or more of the label parameters that have been changed.

According to one embodiment, a counter is maintained. Once a label is placed in an image, the counter is incremented in accordance with the label parameters. However, the counter does not decrement when a placed label is deleted unless a reset is activated as shown in FIG. 3E with the initial label set to be "1".

Referring now to FIG. 3B, the icon 314 allows a user to set up the label parameters. One of the label parameters pertains to a selection of a single label or multiple sequential labels. When there is a need to have one type of label for each identified object in an image, a single labeling may be used. When a number of sequential labels in the same style (but not identical in sequence) are to be used in an image, multiple sequential labeling may be used. In addition, ways of aligning labels may be selected as well. In a case in which some objects in an image do not allow labels without obscuring others, one of the label parameters sets a level of transparency of the label itself or its associated surrounding decoration (e.g., a flag, a colored background or a boundary, if there is any). In any case, the determination of the label parameters can be performed before or after the labels are placed and can be configured to subsequently effectuate the labels without the labels being specified.

Figure 3F:
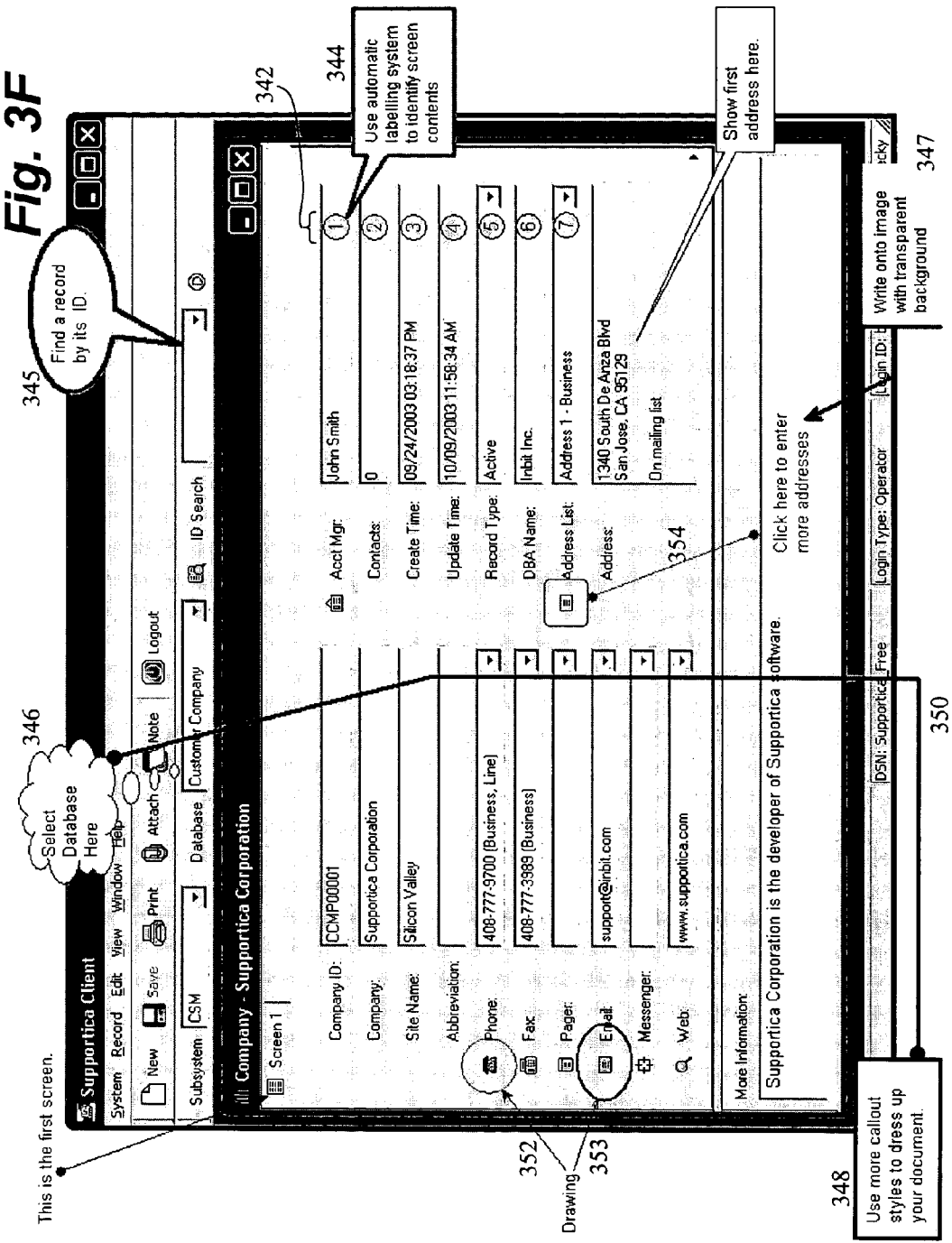
FIG. 3F shows that a captured image is being annotated with some of the exemplary features in the present invention.

Referring now to FIG. 3F, there shows a captured image 340 being annotated with some of the exemplary features in the present invention. There are seven (7) automatically and sequentially generated labels 342, each identifying an object in the image 342. These labels, after being randomly placed upon or near the identified object, are vertically aligned (via activating one of the label parameters). In addition, various shaped text boxes 344–348 may be placed on or near desired objects to allow a user to type in texts to further annotate these objects in the image. Tracing lines 350–354 may be also placed to visually associate a label with an identified object. In one embodiment, the tracing lines may be placed automatically by indicating the object and the position of the label. Such lines may be in different types (e.g., curved, straight, dots).

Figure 4:
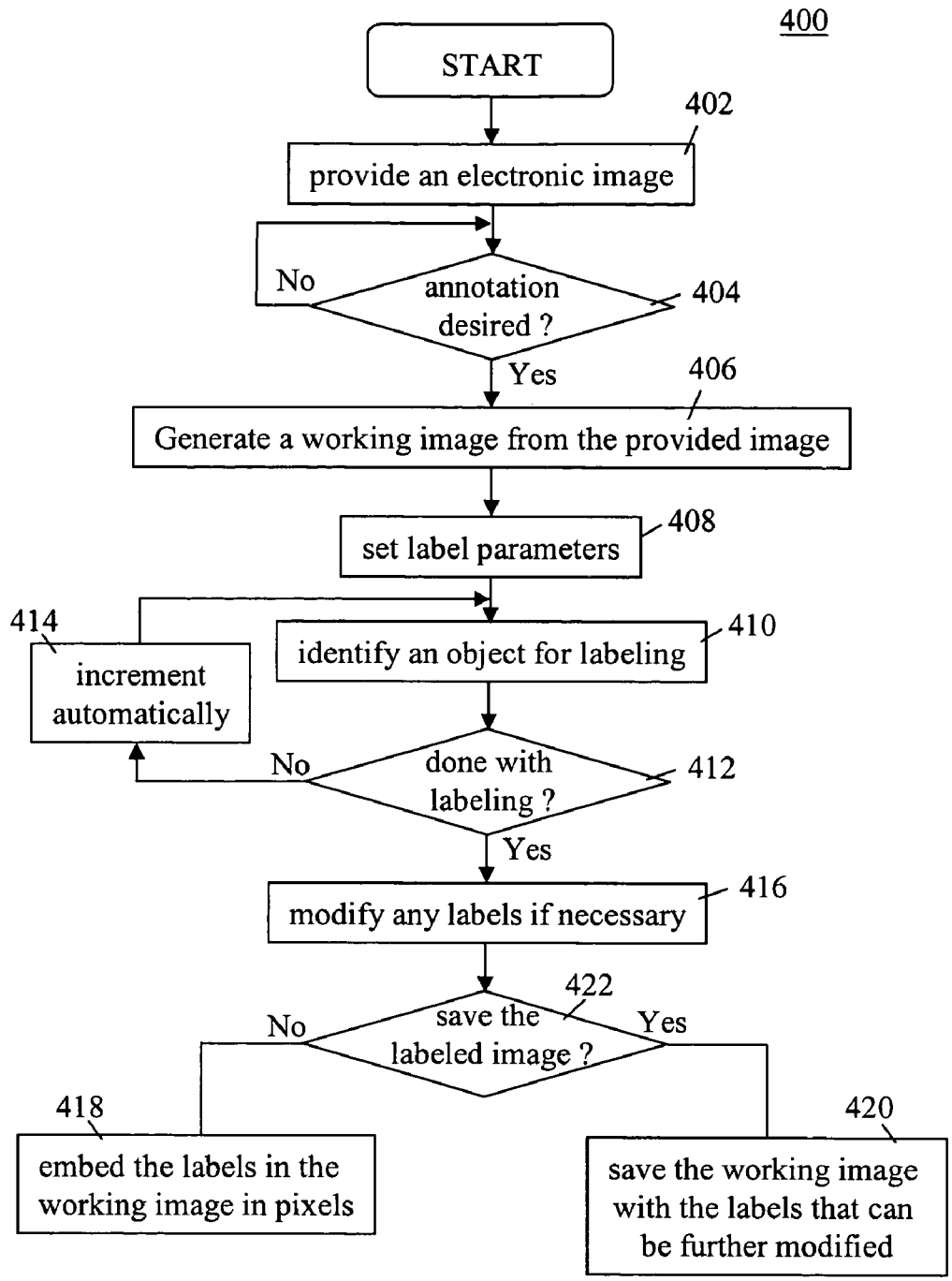
FIG. 4 shows a process flowchart of the present invention that can be executed in a computing device according to an embodiment.

FIG. 4 shows a process flowchart 400 of the present invention according to one embodiment of the present invention. The order of each block may be reordered according to an exact implementation. Preferably, the process 400 is implemented in software such as C/C++ language and executed under MS Windows OS in a computing device with a display screen such as one shown in FIG. 2.

According to one implementation, the process 400 is embedded in a screen capturing application/module that, after a page (i.e. from a web site or locally generated) is displayed, captures an entire or partial display of the page.

Regardless that an electronic image is captured or imported, the electronic image is provided at 402. At 404, a user decides if an annotation of the image is needed. As described above, an image, when used in a manual, often uses labels to identify objects therein such that these objects can be more efficiently explained. The labels may include numerals, alphabets, or alphanumeric characters in different fonts, sizes or boundaries or shapes, with or without the tracing lines.

When the user decides to annotate the provided image at 404, perhaps by activating the annotation icon 314 in FIG. 3B, a duplicated image referred to as a working image is generated at 406. In one embodiment, the working image is stored in a canvas provided in Microsoft operating system. In another embodiment, the provided image is the working image itself but, preferably, placed as an image layer over a canvas that may be identical to or different from the size of the provided image. Another layer is then formed on top of the image layer for labeling. In any case, the image on which labels are to be placed upon is referred to as a working image. At 408, parameters for labeling are determined. The parameters pertain to a particular font, a type, a size, a shape or transparency of labels or surrounding decorations (e.g., a flag, a thumbnail image, a boundary). One of the parameters is an increment to be determined by the user how to change one label to another in sequence.

At 410, an object in the working image is identified (e.g., by a mouse arrow). A desired label is then automatically placed upon or near the object (e.g., at a click of a mouse), the desired label may be repositioned if desired. At 412, the user determines whether the last object has been labeled. If this is not the last object, the process 400 goes to 414 where a counter increments to create a next proper label. The process 400 goes to 410 again to allow the user to identify a next object in the working image. Thus a label in accordance with the counter is placed upon or near the next object. Again, at 412, the user determines whether the last object has been labeled.

It is assumed that the last object has been labeled. The process 400 now goes to 416 where the user can modify the labels that have been respectively placed upon or near the identified objects. Another one of the important features in the present invention is the flexibility to modify these labels. According to one embodiment, the modification of these labels includes removal of one or more of these labels, alignment of some of all labels with respect to a location, resize or renumber the labels.

In one embodiment, each label is surrounded by a boundary in a predetermined shape (e.g., a round, a square, a triangle or an arrow). Each of the six sequential labels in FIG. 3C, for example, is surrounded by a rectangular boundary. When the number of characters or digits in a boundary is increased, for example, from 99 to 100, the process 400 is configured to maintain the size of the boundary unchanged by automatically shrinking the size of the characters in the boundary such that all the labels appear uniform.

According to another embodiment, one or more text boxes are added to elaborate some of the objects. Some or all of the exemplary annotations in FIG. 3F may be added or edited at 416.

At 422, the user is offered to save the labeled image in two different ways. The first way at 418, all the labels in the working image are embedded into the image, namely, the labels become part of the image permanently. On the other hand, the second way at 420, the labels and the working image are stored in a file that keeps the labels and the image separately. The advantage of such file can facilitate any subsequent changes the user may desire to these labels.

The present invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, floppy disks, CD-ROMs, DVDs, magnetic tape, optical data storage devices, carrier waves. The computer readable medium can also be distributed over network coupled computer systems so that the computer readable code is stored and executed in a distributed fashion.

The advantages of the invention are numerous. Different embodiments or implementations may yield one or more of the following advantages. One advantage of the invention is that labels can be easily placed upon or near identified objects. In particular, these labels are sequential in accordance with a predetermined increment and appear systematical. Another advantage of the invention is modifications to the labels can be performed by resetting the label parameters without selecting all the labels. Other advantages, features and benefits can be appreciated from the detailed description herein.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for automatically labeling an image, the method comprising:
   providing a working image that includes a number of objects;
   determining label parameters for labels to be associated with at least some of the objects, wherein the label parameters determine a style of the labels and a preferable increment set by a user in accordance with how the image is used;
   placing a first label in the working image when one of the objects is selected;
   placing a second label in the working image when another one of the objects is selected, wherein the second label is automatically generated in accordance with the label parameters, and the second label is different from the first label by the increment.

2. The method of claim 1, wherein the placing of the first label and in the working image includes placing automatically a tracing line between the first label and the one of the objects to indicate a visual association therebetween, and wherein the placing of the second label in the working image includes placing automatically a tracing line between the second label and the another one of the objects to indicate a visual association therebetween.

3. The method of claim 2, wherein the working image is generated from the image and placed in a canvas for the labels.

4. The method of claim 2, wherein the working image is an image layer in a plurality of layers, one of the layers being designated for the first and second labels.

5. The method of claim 4, wherein one of the layers is considered as a base layer being larger in size than that of the working image.

6. The method of claim 1, wherein the increment is an offset from one label to another such that no two labels used in the working image are identical.

7. The method of claim 6, wherein the style determines one or more of fonts, sizes, shapes, boundaries or transparency of the labels.

8. The method of claim 1, wherein one of the labels is associated with an annotation box in which a user can type in texts.

9. The method of claim 1 further including resetting the label parameters; and causing the labels that have been placed in the working image to change automatically in accordance with the label parameters.

10. The method of claim 9, wherein each of the labels includes a set of digits or characters in a boundary, and further including adjusting a size of the digits or characters in the boundary, when a number of the digits or characters increases, to maintain a size of the boundary unchanged.

11. The method of claim 1, wherein the working image can be saved in a desired format to embed the first and second labels or in a file that keeps the working image and the labels separately so that further editing to the labels is possible.

12. A software product to be executable in a computing device for automatically labeling an image, the software product comprising:
    program code for providing a working image from the image that includes a number of objects;
    program code for determining label parameters for labels to be associated with at least some of the objects, wherein the label parameters determine a style of the labels and a preferable increment set by a user in accordance with a use of the image;
    program code for placing a first label in the working image when one of the objects is selected;
    program code for placing a second label in the working image when another one of the objects is selected, wherein the second label is automatically generated in accordance with an increment from the first label.

13. The software product of claim 12, wherein the program code for placing the first label in the captured image includes program code for placing automatically a tracing line between the first label and the one of the objects to indicate a visual association therebetween, and wherein the program code for placing the second label in the captured image includes program code for placing automatically a tracing line between the second label and the another one of the objects to indicate a visual association therebetween.

14. The software product of claim 13, wherein the working image is either a generated version of the image or an image layer in a plurality of layers in which one of the layers is a base layer.

15. The software product of claim 12, wherein the increment is an offset from one label to another such that no two labels used in the working image are identical.

16. The software product of claim 12, wherein the style determines one or more of fonts, sizes, shapes, boundaries or transparency of the labels.

17. The software product of claim 12, wherein one of the labels is associated with an annotation box in which a user can type in texts.

18. The software product of claim 12 further including program code for resetting the label parameters; and causing the labels that have been placed in the working image to change in accordance with the label parameters.

19. The software product of claim 18, wherein each of the labels includes a set of digits or characters in a boundary, and further including program code for adjusting a size of the digits or characters in the boundary, when a number of the digits or characters increases, to maintain a size of the boundary unchanged.

20. The software product of claim 12, wherein the working image can be saved in a desired format to embed the first and second labels or in a file that keeps the working image and the labels separately so that further editing to the labels is possible.

21. A method for automatically labeling an image, the method comprising:
    providing a graphic environment in which an electronic image is displayed, the graphic environment including a plurality of icons, one of the icons, once activated, providing a working image from the image that includes a number of objects and displaying a number of annotation icons, wherein one of annotation icons facilitating determination of label parameters for labels to be associated with at least some of the objects, the label parameters determine a style of the labels and a preferable increment set by a user in accordance with a use of the image;
    placing a first label in the working image when one of the objects is selected;
    placing a second label in the working image when another one of the objects is selected, wherein the second label is automatically generated in accordance with an increment in one of the label parameters;
    placing additional labels in the working image when additional ones of the objects are respectively selected, wherein the additional labels are respectively and automatically generated in accordance with the increment with reference to a preceding label thereof; and
    saving the working image with the labels placed therein in a predetermined format to embed the labels or in a file that keeps the working image and the labels separately so that further editing to the labels is possible.

22. The method of claim 21, wherein the style determines one or more of fonts, sizes, shapes, boundaries or transparency of the labels.

23. The method of claim 21, wherein the working image is either a generated version of the image or an image layer in a plurality of layers in which one of the layers is a base layer.

\* \* \* \* \*